UNITED STATES PATENT OFFICE.

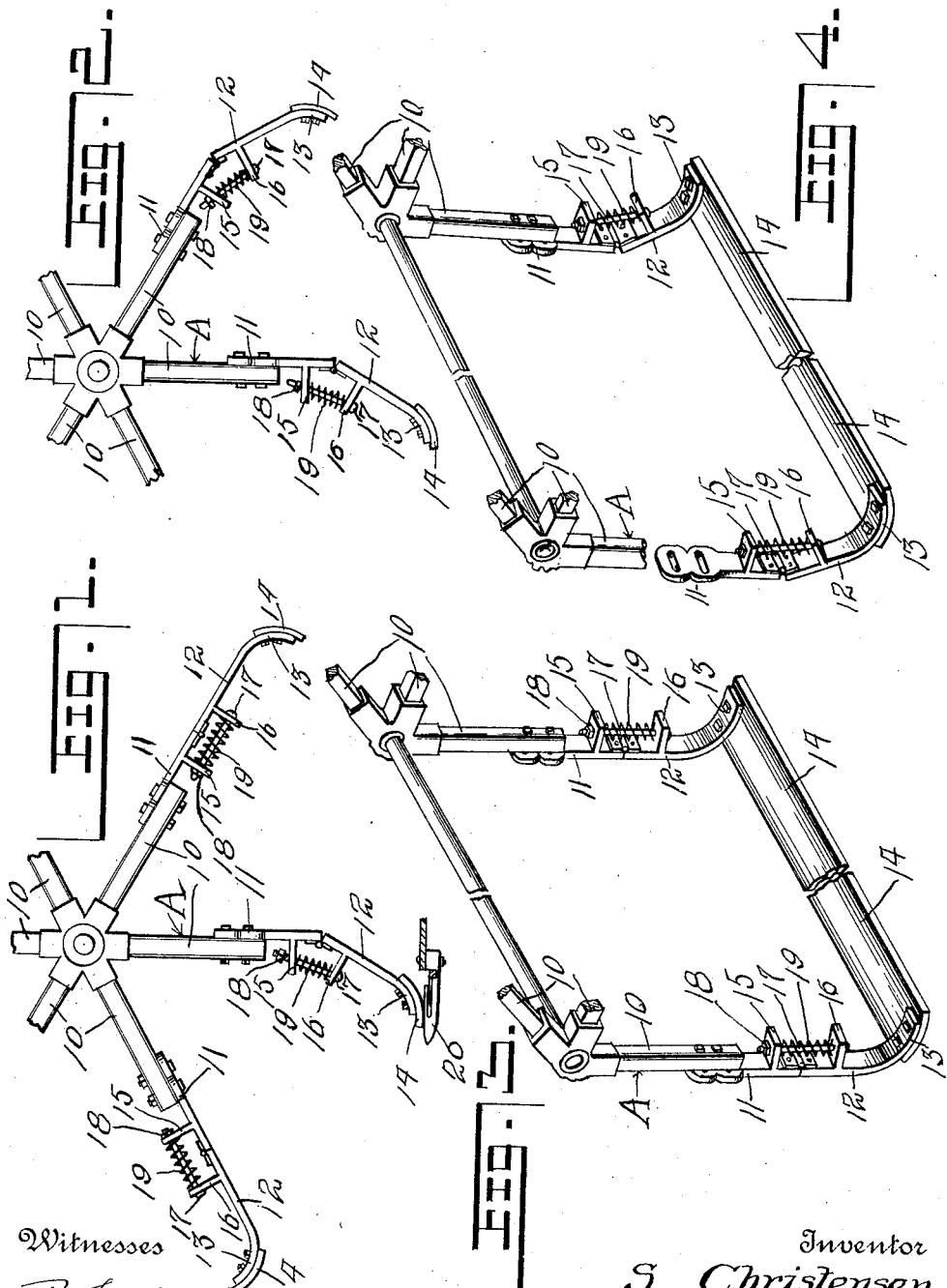

STANLEY CHRISTENSEN, OF POWERS LAKE, NORTH DAKOTA.

HARVESTER-REEL.

1,113,602.  Specification of Letters Patent.  Patented Oct. 13, 1914.

Application filed April 30, 1913. Serial No. 764,629.

*To all whom it may concern:*

Be it known that I, STANLEY CHRISTENSEN, a citizen of the United States, residing at Powers Lake, in the county of Burke, State of North Dakota, have invented certain new and useful Improvements in Harvester-Reels; and I do hereby declare the following to be a full, clear, and exact description of the invention, such as will enable others skilled in the art to which it appertains to make and use the same.

This invention relates to harvester reels.

The object of the invention resides in the provision of a harvester reel which will efficiently move the grain from the sickle of a harvesting machine to the elevator even though the machine is operating in very short grain.

A further object of the invention resides in the provision of a harvester reel in which the rails connecting the spokes of the reel may be adjusted relatively to the longitudinal axis of the reel.

With the above and other object in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a fragment of a harvester reel constructed in accordance with the invention and showing same in operative relation to the sickle of a harvesting machine; Fig. 2, a side elevation of a fragment of a harvester reel showing the rails adjusted inwardly from what is disclosed in Fig. 1; Fig. 3, a detail perspective view of a fragment of a harvester reel constructed in accordance with the invention, and Fig. 4, a view similar to Fig. 3 showing the rail of the reel in an adjusted position.

Referring to the drawings A indicates a harvester reel which includes a plurality of radial spokes 10 disposed at each end of the reel. Secured to the outer end of each spoke 10 and forming a continuation of said spoke is an angularly adjustable extension member 11. Hinged to the outer end of the extension member 11 is a member 12 the free end of which is curved as at 13. Corresponding members 12 are connected at their outer ends by a rail 14, said rail being curved transversely to correspond to the curved outer end of the member 12. It will be noted that the hinged connection between the members 11 and 12 is so disposed as to permit movement of the member 12 in a direction opposite to the rotation of the reel, while movement of the member 12 out of longitudinal alinement with the member 11 in a direction opposite to the direction of rotation of the reel is prevented. Projecting laterally from the members 11 and 12 are arms 15 and 16 respectively. Secured to the arms 16 is one end of a bolt 17 while the other end of said bolt passes through the opening in the arm 15. Threaded on the bolt 17 at the end thereof adjacent the arm 15 is a nut 18. Surrounding the bolt 17 is a spring 19 one end of which bears against the arm 16 while the other end thereof bears against the arm 15. This spring 19, as will be apparent, constantly tends to hold the members 11 and 12 in longitudinal alinement.

During the rotation of the reel the rails 14 will successively engage the sickle guards 20 and as the result the member 12 will be moved at an angle to the member 11 to allow the passage of the rail 14 over the guards. As a result of this engagement of the rail 14 it will be apparent that the grain, no matter how short will be efficiently moved to the elevator.

It will be noted that the opening in the arm 15 is of sufficient size to prevent binding of the bolt 17 during the movement of the member 12 relatively to the member 11.

It will be further noted that by adjusting the nut 18 on the bolt 17 the member 12 may be disposed at an angle to the member 11 and the rail 14 drawn inwardly of the reel. This adjustment of the reel 14 is quite useful where the machine is to be operated in grain of different lengths.

What I claim is:—

In a harvester reel having corresponding radial arms at each end, an extension member, a second member hinged to the outer ends of each extension member, said second member having its free end curved and extended oppositely to the direction of rotation of the reel, rails connecting the free ends of corresponding second named members, lateral arms on each of said members, spring means carried by said arms for yieldingly holding the second member against movement in one direction, enlarged portions provided with a plurality of transverse slots formed on the inner end of each extension member, and a plurality of bolts mounted in each of said arms and engaged through respective slots in the enlarged ends in the corresponding extension member whereby said extension member may be adjusted bodily in a lateral direction.

In testimony whereof, I affix my signature in the presence of two witnesses.

STANLEY CHRISTENSEN.

Witnesses:
N. J. OREDSON,
ALEKKEL SORENSEN.

Copies of this patent may be obtained for five cents each, by addressing the "Commissioner of Patents, Washington, D. C."